(12) United States Patent
Dipper

(10) Patent No.: US 8,161,070 B2
(45) Date of Patent: Apr. 17, 2012

(54) EFFICIENT DELTA HANDLING IN STAR AND SNOWFLAKE SCHEMES

(75) Inventor: Stefan Dipper, Wiesloch (DE)

(73) Assignee: SAP AG, Waldorf (DE)

( * ) Notice: Subject to any disclaimer, the term of this patent is extended or adjusted under 35 U.S.C. 154(b) by 446 days.

(21) Appl. No.: 12/167,187

(22) Filed: Jul. 2, 2008

(65) Prior Publication Data

US 2010/0005114 A1      Jan. 7, 2010

(51) Int. Cl.
*G06F 17/30*      (2006.01)

(52) U.S. Cl. ........................................................ 707/790

(58) Field of Classification Search ................... 707/101
See application file for complete search history.

(56) References Cited

U.S. PATENT DOCUMENTS

2008/0059524 A1 *   3/2008   Biedenstein et al. ...... 707/104.1

* cited by examiner

*Primary Examiner* — Sheree Brown

(74) *Attorney, Agent, or Firm* — Mintz, Levin, Cohn, Ferris, Glovsky & Popeo, P.C.

(57) ABSTRACT

In one aspect there is provided a method for handling deltas being posted to a repository, database, or other Business Information Warehouse (BW). The method includes receiving, at a delta handler, absolute data without an indication of a change between the received absolute data and data posted to a repository including a fact table. Identifiers are created for the received absolute data. The absolute data including the created identifier is written into a temporary table. One or more deltas are determined by performing a join of the temporary table and the fact table of the repository. The deltas correspond to the indication of the change between the received absolute data and the data posted to the repository. The delta handler provides the one or more deltas to be posted to the fact table of the repository. Related systems, apparatus, methods, and/or articles are also described.

18 Claims, 4 Drawing Sheets

EFFICIENT DELTA HANDLING IN STAR AND SNOWFLAKE SCHEMES

FIELD

This disclosure relates generally to data processing and, more particularly, to handling changes to data.

BACKGROUND

For the modern enterprise, maintaining data consistency with respect to data originating from a variety of data sources is strategically important to the enterprise. This requirement may be achieved by implementing a data warehouse. To that end, SAP's Business Information Warehouse (BW) system consolidates data (e.g., external and the internal sources of data) into a single repository. Moreover, the BW provides preconfigured data and methods to aid a business enterprise when dealing with data management and archiving.

One aspect of the BW is the cube (also referred to as an infocube). The cube refers to multidimensional data. In some cases, the cube is multi-dimensional data physically represented as a "star" schema, a "snowflake" schema, or some other type of structure as well. Cubes thus provide multidimensional data storage containers for reporting data and for analyzing data. The star schema refers to a structure of data including one or more fact tables and one or more dimension tables. The facts of the fact table are classified along the dimensions. For example, the fact tables hold the main data, while the dimension tables describe dimension data (typically referred to as characteristics) that can be joined to fact tables as needed. The snowflake schema is another way of arranging fact and dimension tables in a relational database such that the entity relationship diagram resembles a snowflake in shape. At the center of the snowflake schema are one or more fact tables, which are connected to multiple dimension group tables, each grouping together several dimensions. The star and snowflake schemas thus provide ways to implement a multi-dimensional database using a mainstream relational database.

FIG. 4 depicts an example framework for a cube and, more specifically, a snowflake schema. The cube is a database framework (or architecture) including a central database table, such as a fact table 410. The fact table may include measures (also typically referred to as key figures) corresponding to data of interest. The measures are data that can be aggregated (e.g., added). The fact table may be surrounded by associated dimension group tables, such as dimension group table 420, that group one or more other dimensions, such as characteristic tables. The dimension group tables include references pointing to master data tables including so-called characteristics assigned to the measures. A dimension group table may be used as a simple grouping of characteristics that do not necessarily have hierarchical dependencies. For example, characteristics that logically belong together (district and area, for example, belong to a regional dimension) may be grouped together in a dimension group table. By adhering to this design criterion, dimension group tables are largely independent of each other, and these dimension group tables remain small with regards to data volume, which may be desirable for reasons of performance. The dimension group table offers the advantage of a fewer number of indexes required in the fact tables compared to a star scheme not using dimension group tables.

SUMMARY

The subject matter disclosed herein provides methods and apparatus, including computer program products, for handling deltas in data structures, such as star and snowflake schemes.

In one aspect there is provided a method. The method includes receiving, at a delta handler, absolute data without an indication of a change between the received absolute data and data posted to a repository including a fact table. Identifiers are created for the received absolute data. The absolute data including the created identifier is written into a temporary table. One or more deltas are determined by performing a join of the temporary table and the fact table of the repository. The deltas correspond to the indication of the change between the received absolute data and the data posted to the repository. The delta handler provides the one or more deltas to be posted to the fact table of the repository.

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWING

These and other aspects will now be described in detail with reference to the following drawings.

Like reference symbols in the various drawings indicate like elements.

DETAILED DESCRIPTION

The subject matter described herein relates to handling deltas, including determining and writing deltas efficiently to a data warehouse.

Figure 1:
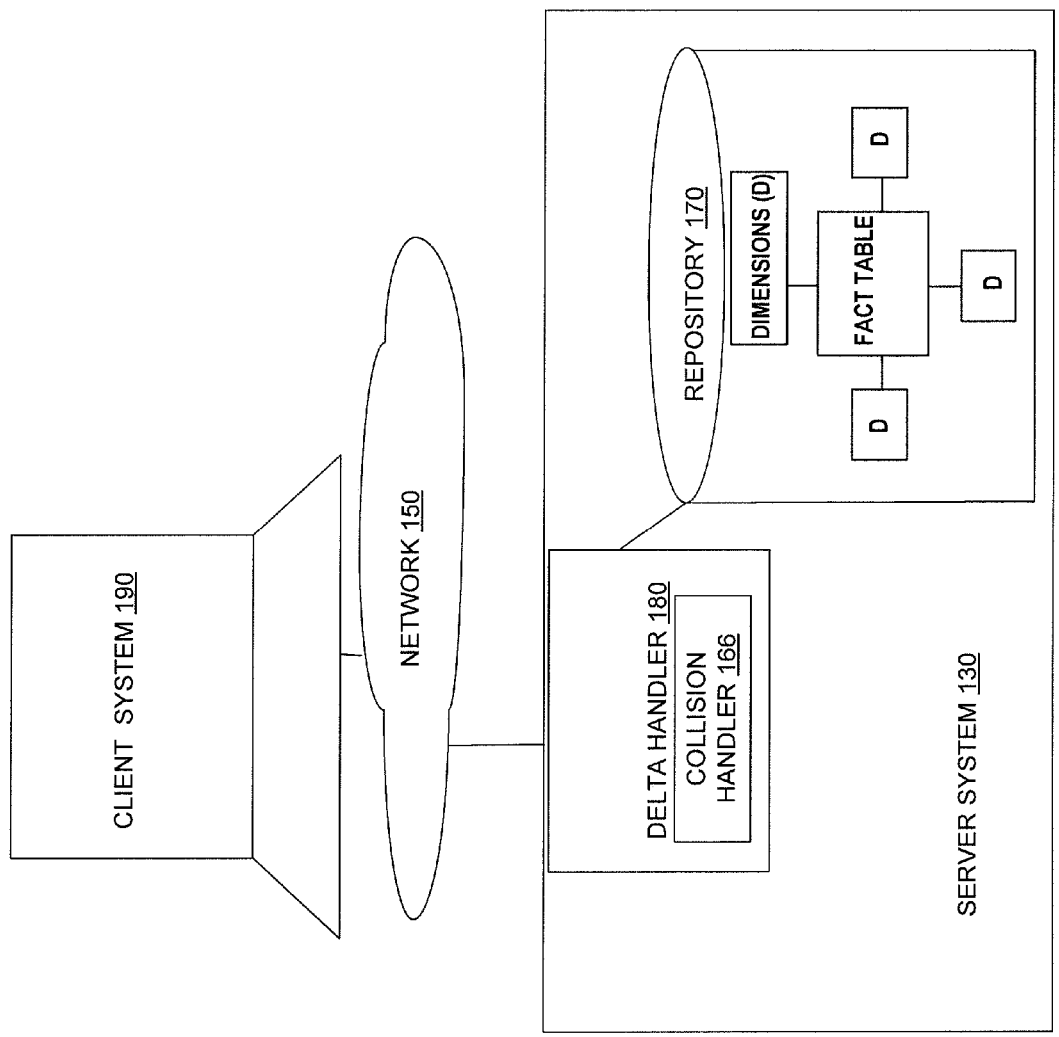
FIG. 1 illustrates a system for handling deltas (e.g., changes to data) posted to a data warehouse.

FIG. 1 depicts an exemplary system 100 for handling deltas to be posted to a data warehouse, such as a repository 170 including cube data, such as data structured as a snowflake schema, a star schema, or any other structure as well. The system 100 includes a client system 190 coupled to a server system 130 through a network 150 (e.g., the Internet or an intranet). The client system 190 and server system 130 may be implemented as one or more processors, such as a computer, a server, a blade, and the like. The server system 130 further includes a delta handler 180 and repository 170.

The repository 170 typically includes structured data, such as objects, business objects, and the like. The term "object" refers to a data structure including at least one of data and related methods, while the phrase "business object" refers to an object used in connection with a business process or a task.

In some implementations, repository 170 is implemented as a BW including data, such as multi-dimensional data, structured in cubes. The cubes may include fact tables, dimension group tables, and other dimension tables, such as characteristic tables, formatted in a data structure, such as the star schema or the snowflake schema, although other data structures of the data may be used as well.

The server system 130 further includes a delta handler 180 for handling deltas. The delta handler 180 may be implemented as a program or a component, i.e., a small binary object (e.g., an applet) or program that performs a specific function and is designed in such a way to operate easily with other components and applications, such as a database application, BW application, user interfaces, and the like. In some implementations, delta handler 180 is implemented as a service (e.g., as part of SAP's Enterprise Services Framework) or Web service accessible by other applications through an intranet and/or the Internet. The delta handler 180 may perform one or more of the following functions: receive data to be posted to a BW, determine deltas for the received data, and post the data to the BW, although the delta handler may perform other functions as well.

Figure 4:
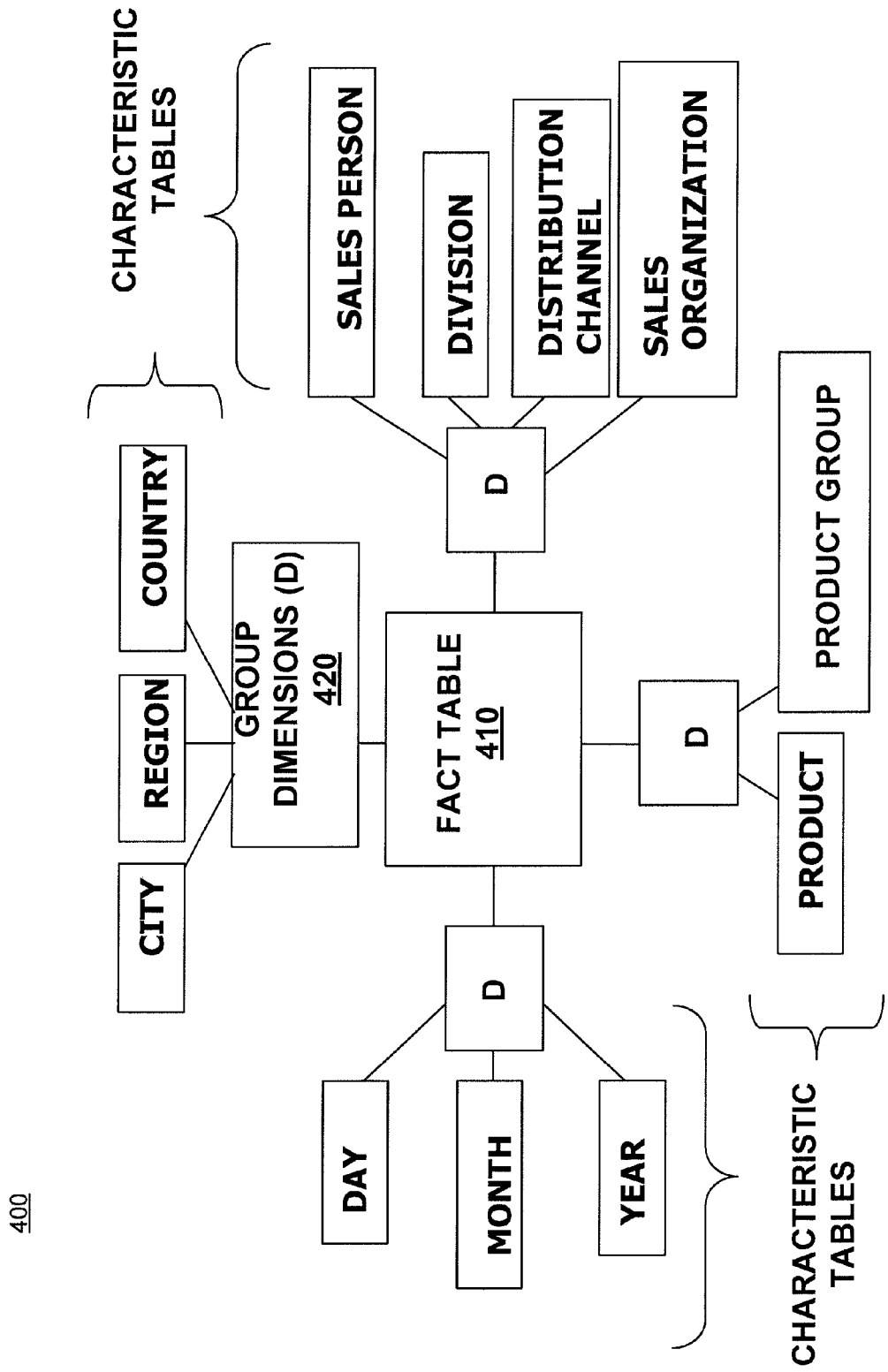
FIG. 4 depicts a block diagram of a data warehouse including multi-dimensional data formatted as a star schema.

In some implementations, the repository 170 includes data structured as a snowflake schema, such as the schema depicted at FIG. 4, although other structures may be used as well. When a snowflake schema is used, the one or more fact tables include data that is considered to be of the aggregation type (e.g., measures capable of being summed or added). Moreover, the dimension or dimension group tables associated with the fact table are associated using keys (also referred to as key identifiers (IDs) or DIMIDs) during the delta handler's 180 determination of the delta. However, the source (e.g., client system 190) of the data being posted (e.g., written and/or stored) to the repository 170 may deliver data to the server system 130 in a so-called "flat structure" representing a view on the fully joined scheme, i.e., as absolute data without an indication of the changes between the data being delivered and the data already stored in the repository 170. In most implementations, the repository 170 includes a snowflake scheme, which only posts deltas rather than absolute data. For example, client system 190 may provide absolute data reporting to delta handler 180 that customer A has purchased 150 parts over a given time period. However, a fact table at repository 170 may already have a record indicating that customer A has previously purchased 100 parts. In this example, delta handler 180 must determine the delta between the before image (i.e., the 100 parts stored in the fact table of repository 170) and the after image (i.e., the current total number of parts purchased by customer A), so that only the delta, e.g., the 50 parts, is posted to the fact table of repository 170. The delta handler 180 thus processes the absolute data without any indication of the change between the before and after image, so that the appropriate data, such as a delta, can be stored in repository 170.

Figure 2:
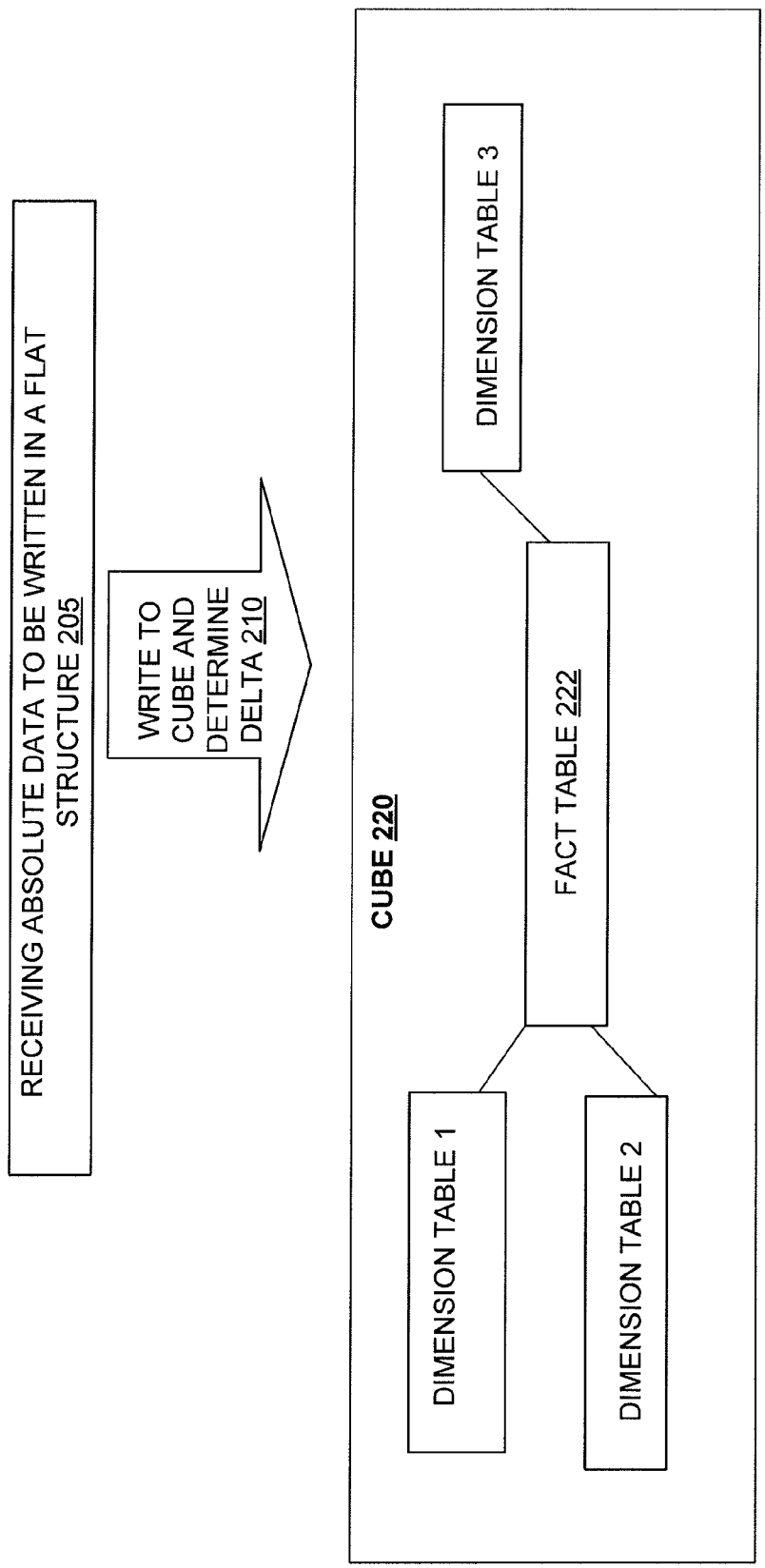
FIG. 2 illustrates an overview of the handling of deltas posted to a cube of a data warehouse.

FIG. 2 depicts a block diagram of the process associated with determining the delta. Referring to FIG. 2, absolute data 205 is received from client system 190 at delta handler 180 in a typically flat structure, i.e., without an indication of what the delta is. At 210, delta handler 180 then determines the delta while writing the data to cube 220 of repository 170 or some other structured data, such as the snowflake schema depicted at FIG. 4. The determined delta is stored in the fact table 222.

Figure 3:
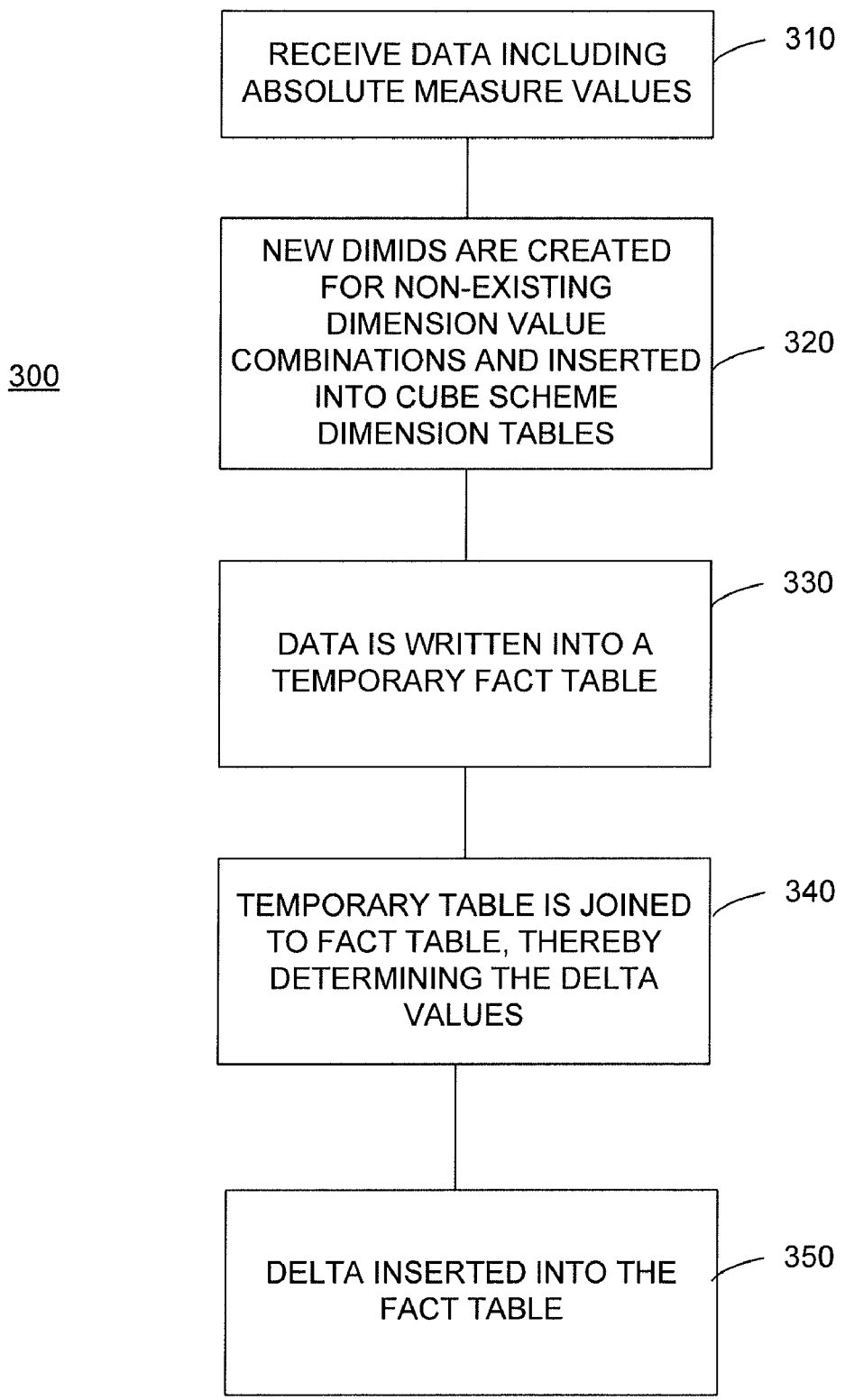
FIG. 3 depicts a process 300 for handling deltas posted to a cube of a data warehouse.

FIG. 3 depicts a process 300 for determining the delta while writing the data to a cube.

At 310, data is received at the delta handler 180 from a system, such as client system 190. The received data may be considered absolute data, i.e., data for which a delta has not been determined. Since it is computationally burdensome on server 130 to store to the repository 170 all of the received data, server 130 determines the delta (i.e., data representing changes to data already stored at the cube structured as star or snowflakes schemes). The received data may include measure data (e.g., key figures, measured data, and the like) to be posted to a fact table of repository 170. Table 1 below depicts an example of absolute data received at 310. The columns A and B represent dimensions (e.g., characteristics and/or groups of characteristics) typically found in a dimension table, and columns Measure_1 and Measure_2 represent measure data typically found in a fact table.

TABLE 1

Example of Absolute Data
Absolute Data

| A | B | Measure_1 | Measure_2 |
|---|---|---|---|
| 15 | 11 | 6000 | 23 |
| 08 | 15 | 600 | 3 |

Tables 2 and 3 depict examples of dimension group tables and fact tables that would already exist as a snowflake schema in repository 170, when the absolute data is received at 310.

TABLE 2

Example of a Dimension Group Table
Dimension Group Table

| DIMID | A | B |
|---|---|---|
| 47 | 15 | 11 |
| 51 | 15 | 11 |
| 53 | 08 | 15 |
| 55 | 08 | 15 |

TABLE 3

Example of a Fact Table
Fact Table

| DIMID_1 | Measure_1 | Measure_2 |
|---|---|---|
| 47 | 1000 | 15 |
| 51 | 3000 | 17 |
| 53 | 500 | 19 |

At 320, DIMIDs are created for any dimension value tuples (e.g., one or more values of a row of a dimension table) that do not yet exist in the dimension group table. For example, delta handler 180 determines whether the received absolute data, such as the absolute data of Table 1 above, has dimension tuples, such as tuples 15 and 11 and tuples 08 and 15, which are already present in the dimension group table(s) stored in the repository 170. In the example depicted by Tables 1-3, delta handler 180 determines that the dimensions 15 and 11 have DIMIDs of 47 and 51 and dimension tuples 08 and 15 have DIMIDs of 53 and 55. In this example, there is no need to create a new DIMID. If a DIMID does not exist for a dimension tuple in the received data, which is not the case in the example of Tables 1-3, a DIMID is created and inserted into the dimension group table, such as Table 2 above. For example, if the absolute data of Table 1 included a dimension tuple of 77 and 12 and measured values of 500 and 20, a DIMID would be created (e.g., 89) for that tuple and inserted as a row of Table 2 and that created DIMID would also be inserted into a row at an associated fact table, such as Table 3, along with the measured values of 500 and 20.

At 330, the absolute data received at 310 is written into a temporary table structured as a fact table. Moreover, the dimension tuples of the received data are replaced with DIM-IDs. Table 4 below depicts the temporary table with the dimension tuples 15 and 11 as well as 08 and 15 replaced with DIMIDs. As such, a temporary table is created with DIMIDs 47, 51, 53, and 55, as depicted by Table 4 below.

TABLE 4

Example of a Temporary Table
Absolute Values based on DIMIDS

| DIMID_1 | Measure_1 | Measure_2 |
|---|---|---|
| 47 | 6000 | 23 |
| 51 | 0 | 0 |
| 53 | 600 | 3 |
| 55 | 0 | 0 |

In some implementations, the DIMIDs may not be unique, i.e., the relationship between a dimension tuple to a DIMID is not one-to-one. In the case of Table 2 above, the relationship between the DIMIDs and the dimension tuples is not one-to-one as DIMIDs 47 and 51 are duplicates for the same dimension tuples, such as 15 and 11. When this is the case, one of the duplicate DIMIDs is entered in the temporary table, such as Table 4, with zero (0) measured values. Because the fact table stored in repository 170 can have duplicate postings of data, the use of a zero entry at the temporary table eliminates the possibility that the measured data is posted twice as a result of the duplicate DIMIDs and the join performed at 340. In some implementations, a collision handling process is used to identify these duplicates and create entries with zero data, although other processes may be used as well that avoid duplicate DIMIDs and posting measures twice (e.g., measured values) to a fact table. When the relationship between the DIMIDs and the dimension tuples is one-to-one, the use of collision handling is typically not necessary. Collision handling is performed by replacing dimension members (e.g., "characteristic values") by DIMIDs and ensuring any intermediate result sets contains one row for all possible combinations of DIMIDs, and the measures are only contained in exactly one row.

At 340, the temporary table is joined to the fact table—thus calculating the delta for the tuples inside the temporary table. In some implementations, an SQL statement, further described below, may be used to join (e.g., as a left outer join) the temporary table to the fact table. Specifically, tuples inside the temporary table that do not have a matching tuple inside the fact table are inserted into the fact table. In this case, the term "coalesce(sum(f.measure_1, 0)" (see line 7 of Table 5) results in 0 being inserted as a measure of the row. For tuples with a matching tuple inside the fact table, the difference between the current values in the cube scheme (e.g., the so-called "before-image") and the new absolute values is calculated and then written as a delta into the cube scheme. If the delta for a given tuple is empty (all measures are 0), it need not be written into the cube scheme because the before-image already contains the final values. This "0" case is done using the having clause in the SQL statement (see lines 18-22 of Table 5). In the example of Table 5, a package dimension is used in addition to identify all data that belongs to one delta update operation.

TABLE 5

Example SQL Statement for a Left Outer Join of Temporary Table and Fact Table

| Row Number | Example Code for SQL Statement |
|---|---|
| 1 | insert into facttable ( ... ) |
| 2 | select |
| 3 | fix-values as t.dimid_package, |
| 4 | t.dimid1, |
| 5 | ..., |
| 6 | sum(t.measure_1) |
| 7 | - coalesce( sum( f.measure_1, 0 ) as |
| 8 | Measure_1, |
| 9 | sum(t.measure_2) |
| 10 | - coalesce( sum( f.measure_2, 0 ) as |
| 11 | Measure_2, |
| 12 | ... |
| 13 | from temptable t |
|  | left outer join facttable f on |
| 14 | t.dimid1 = f.dimid1 and |
| 15 | ... |
| 16 | group by t.dimid1 |
| 17 | ..., |
| 18 | Having |
| 19 | sum(t.measure_1) |
| 20 | - coalesce( sum( f.measure_1, 0 ) <> 0 OR |
| 21 | sum(t.measure_2) |
| 22 | - coalesce( sum( f.measure_2, 0 ) <> 0 |
| 23 | - |

Given the example above of Tables 1-5, the determined delta(s) to be inserted into the fact table of repository 170 is given by Table 6 below. In some implementations, the last row of Table 6 may not be written into the fact table, as all measures are zero.

TABLE 6

Example of Deltas to be Posted as Measures at the Fact Table of Repository 170.
Deltas based on DIMIDs

| DIMID_1 | Measure_1 | Measure_2 |
|---|---|---|
| 47 | 5000 | 8 |
| 51 | −3000 | −17 |
| 53 | 100 | −16 |
| 55 | 0 | 0 |

At 350, the delta determined at 340 is inserted into the fact table stored at repository 170. Referring again to the previous example, the deltas of Table 6 are inserted, by the delta handler 180, into the fact table of Table 3. Table 7 depicts the fact table of Table 3 after the insertion of the delta values.

TABLE 7

Fact Table After Deltas Inserted
Fact Table

| DIMID_1 | Measure_1 | Measure_2 |
|---|---|---|
| 47 | 1000 | 15 |
| 51 | 3000 | 17 |
| 53 | 500 | 19 |
| 47 | 5000 | 8 |
| 51 | −3000 | −17 |
| 53 | 100 | −16 |

As noted above, the same dimension tuples can have different DIMIDs, so that there is not a one-to-one correspondence between the dimension tuples and the DIMID. This lack of a one-to-one correspondence has to be taken into account when calculating the deltas because dimension tuples with the identical dimension combination can have different DIMIDs in the fact table.

Referring again to delta handler 180, if the data source, such as client system 190, is only able to deliver absolute data values without any indication of the delta, the delta is determined by the delta handler 180 before the data is posted into the repository 170, which may eliminate the need to perform complex processing of data provided by a client system to format the received data into a complex structure, such as a BW data store object. The data store object refers to a complex data structure including metadata containing key fields (e.g., document number/item) and data fields that can also contain character fields (e.g., order status, customer, and the like) as measures that can be stored in a star or snowflake scheme. Furthermore, the application needs to logically lock the dimension tuples of all rows during the delta handling and write process in order to prevent concurrent processes to write data containing the same dimension tuple combinations.

Update operations in large database tables can be a very time consuming operation and can invalidate the computed aggregated data on top of a fact data. As such, BW cubes typically allow only insert operations to add only the changes between what is provided by a source systems and the record already booked in the BW cube. These deltas are typically supplied directly by a source system, or the deltas are computed during a "staging process" that inserts only the delta using, for example, an object called a "data store" that can be used to compute any deltas; such a delta computation is typically only performed during a staging process.

SAP's BW uses a technical dimension group referred to as a "package dimension" to group together data that has been loaded within one logical load operation. This package dimension enables a consistent drop and insert of a data package into the cube. It is typically also necessary to consistently roll up new data packages into aggregates (i.e., aggregated data) computed on top of the fact data. The dimension "request," which is part of the package dimension group, uniquely identifies a data package and typically consists of a number and determines the sequence in which the data packages were loaded.

Although the above describes using cube data, other types of data may be used as well to determine the deltas.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Although the description above refers to a client and a server, other frameworks and architectures may be used as well. For example, the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components.

As used herein, the term "user" may refer to any entity including a person or a computer.

The foregoing description is intended to illustrate but not to limit the scope of the invention, which is defined by the scope of the appended claims. Other embodiments are within the scope of the following claims.

What is claimed is:

1. A non-transitory computer-readable storage medium containing instructions to configure a processor to perform a method, the method comprising:
   receiving at a delta handler of a server system absolute data from a client system, the absolute data including measure data and dimension data and containing no indication of any differences between the absolute data and corresponding data currently stored in one or more fact tables of a repository of the server system;
   creating at least one dimension identifier configured to associate at least a portion of the absolute data with one or more dimensions of at least one dimension table of the repository of the server system;
   inserting the at least one created dimension identifier into one or more of the at least one dimension table of the repository;
   writing the absolute data into a temporary fact table, including replacing the dimension data of the absolute data with the at least one created dimension identifier and one or more other dimension identifiers of the at least one dimension table of the repository;
   joining the temporary fact table to at least one of the one or more fact tables of the repository containing the corresponding data to determine one or more deltas, the one or more deltas indicating one or more differences between the absolute data received at the delta handler and the corresponding data currently stored in the repository; and
   posting, by the delta handler, the one or more deltas to at least one of one or more fact tables of the repository containing the corresponding data.

2. The non-transitory computer-readable storage medium of claim 1, wherein receiving further comprises: receiving, as the absolute data, data of a type which can be summed.

3. The non-transitory computer-readable storage medium of claim 1, wherein receiving further comprises: receiving the absolute data configured as a table.

4. The non-transitory computer-readable storage medium of claim 1, wherein receiving further comprises: creating the at least one dimension identifier for a dimension value tuple of the absolute data only when the at least one dimension identifier does not already exist in the at least one dimension table of the repository.

5. The non-transitory computer-readable storage medium of claim 1, wherein the writing further comprises inserting a zero entry into the temporary fact table when the same dimension data of the absolute data corresponds to more than one of the one or more other dimension identifiers of the at least one dimension table of the repository.

6. The non-transitory computer-readable storage medium of claim 1, wherein the writing further comprises utilizing a collision handler to identify when the same dimension data of the absolute data corresponds to more than one of the one or more other dimension identifiers of the at least one dimension table of the repository and insert a zero entry into the temporary fact table.

7. A computer-implemented method comprising:
   receiving at a delta handler of a server system absolute data from a client system, the absolute data including measure data and dimension data and containing no indication of any differences between the absolute data and corresponding data currently stored in one or more fact tables of a repository of the server system;
   creating at least one dimension identifier configured to associate at least a portion of the absolute data with one or more dimensions of at least one dimension table of the repository of the server system;
   inserting the at least one created dimension identifier into one or more of the at least one dimension table of the repository;
   writing the absolute data into a temporary fact table, including replacing the dimension data of the absolute data with the at least one created dimension identifier and one or more other dimension identifiers of the at least one dimension table of the repository;
   joining the temporary fact table to at least one of the one or more fact tables of the repository containing the corresponding data to determine one or more deltas, the one or more deltas indicating one or more differences between the absolute data received at the delta handler and the corresponding data currently stored in the repository; and
   posting, by the delta handler, the one or more deltas to at least one of one or more fact tables of the repository containing the corresponding data.

8. The computer-implemented method of claim 7, wherein receiving further comprises: receiving, as the absolute data, data of a type which can be summed.

9. The computer-implemented method of claim 7, wherein receiving further comprises: receiving the absolute data configured as a table.

10. The computer-implemented method of claim 7, wherein receiving further comprises: creating the at least one dimension identifier for a dimension value tuple of the absolute data only when the at least one dimension identifier does not already exist in the at least one dimension table of the repository.

11. The computer-implemented method of claim 7, wherein the writing further comprises inserting a zero entry into the temporary fact table when the same dimension data of the absolute data corresponds to more than one of the one or more other dimension identifiers of the at least one dimension table of the repository.

12. The computer-implemented method of claim 7, wherein the writing further comprises utilizing a collision handler to identify when the same dimension data of the absolute data corresponds to more than one of the one or more other dimension identifiers of the at least one dimension table of the repository and insert a zero entry into the temporary fact table.

13. A system comprising:
   at least one processor; and
   at least one memory, wherein the at least one processor and the at least one memory are configured to provide a method comprising:
      receiving at a delta handler of a server system absolute data from a client system, the absolute data including measure data and dimension data and containing no indication of any differences between the absolute data and corresponding data currently stored in one or more fact tables of a repository of the server system;
      creating at least one dimension identifier configured to associate at least a portion of the absolute data with one or more dimensions of at least one dimension table of the repository of the server system;
      inserting the at least one created dimension identifier into one or more of the at least one dimension table of the repository;
      writing the absolute data into a temporary fact table, including replacing the dimension data of the absolute data with the at least one created dimension identifier and one or more other dimension identifiers of the at least one dimension table of the repository;
      joining the temporary fact table to at least one of the one or more fact tables of the repository containing the corresponding data to determine one or more deltas, the one or more deltas indicating one or more differences between the absolute data received at the delta handler and the corresponding data currently stored in the repository; and
      posting, by the delta handler, the one or more deltas to at least one of one or more fact tables of the repository containing the corresponding data.

14. The system of claim 13, wherein receiving further comprises: receiving, as the absolute data, data of a type which can be summed.

15. The system of claim 13, wherein receiving further comprises: receiving the absolute data configured as a table.

16. The system of claim 13, wherein receiving further comprises:
   creating the at least one dimension identifier for a dimension value tuple of the absolute data only when the at least one dimension identifier does not already exist in the at least one dimension table of the repository.

17. The system of claim 13, wherein the writing further comprises inserting a zero entry into the temporary fact table when the same dimension data of the absolute data corresponds to more than one of the one or more other dimension identifiers of the at least one dimension table of the repository.

18. The system of claim 13, wherein the writing further comprises utilizing a collision handler to identify when the same dimension data of the absolute data corresponds to more than one of the one or more other dimension identifiers of the at least one dimension table of the repository and insert a zero entry into the temporary fact table.

* * * * *